(No Model.)
A. & L. Q. BRIN.
METHOD OF BLEACHING FIBROUS SUBSTANCES.
No. 396,325. Patented Jan. 15, 1889.
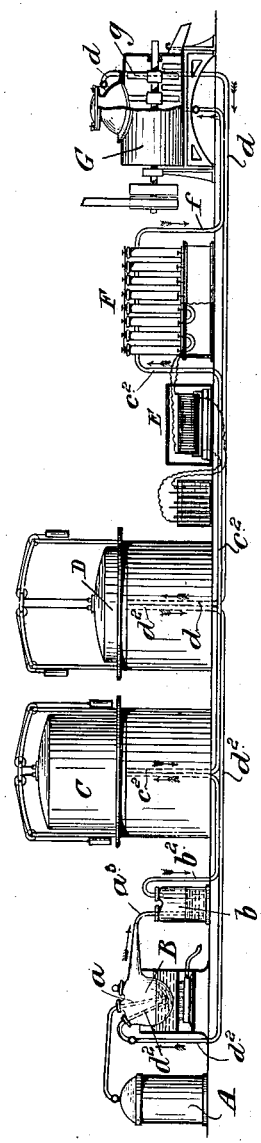

UNITED STATES PATENT OFFICE.

ARTHUR BRIN, OF 59 BROMPTON CRESCENT, COUNTY OF MIDDLESEX, ENGLAND, AND LÉON QUENTIN BRIN, OF PARIS, FRANCE.

METHOD OF BLEACHING FIBROUS SUBSTANCES.

SPECIFICATION forming part of Letters Patent No. 396,325, dated January 15, 1889.

Application filed August 16, 1887. Serial No. 247,074. (No model.) Patented in England April 2, 1887, No. 4,953.

*To all whom it may concern:*

Be it known that we, ARTHUR BRIN and LÉON QUENTIN BRIN, engineers and chemists, citizens of the Republic of France, residing, respectively, ARTHUR BRIN at 59 Brompton Crescent, in the county of Middlesex, England, and LÉON QUENTIN BRIN at 7 Rue Gavarni, Paris, in the Republic of France, have jointly invented certain new and useful Improvements in Methods of Bleaching Fibrous Substances, (for which we have applied for a patent in Great Britain on the 2d day of April, 1887, No. 4,953,) of which the following is a specification.

The object of our invention is to effect the bleaching of fibrous substances used in the manufacture of paper by means of bleaching agents in a gaseous form. The pulp of the fibrous materials is thoroughly washed before or after it leaves the breaking-engine, and after having been mixed with a quantity of water, if necessary, to make it of the proper consistency, it is run into a churn or vessel fitted with revolving beaters or paddles, or with other suitable means for agitating the pulp. This churn or vessel should be so constructed as to be readily closed to prevent escape of the gases used in the treatment, as hereinafter described. The pulp is violently agitated in the churn or vessel by the beaters or their equivalents, and while agitated the said pulp is subjected to the action of a mixture of chlorine and oxygen gases which have been subjected to the action of electricity, and are admitted into the churn or vessel, which may be most conveniently effected by means of a perforated pipe situated at the bottom of the said churn or vessel. The electrical treatment of the chlorine and oxygen may be done in an apparatus such as is used for producing ozone from oxygen. After the pulp has been treated by agitation in the presence of the mixture of chlorine and ozone, as described, the pulp may be thoroughly washed and be then used in the ordinary manner in the manufacture of paper.

Any chlorine and oxygen which escape from the churn or vessel and have not been absorbed by the pulp during the agitating or churning operation may be again treated electrically, so as to be reconverted to chlorine and oxygen or ozone and be used again in the process; or the oxygen may be employed to revivify the oxide of manganese or other metallic oxide used in the manufacture of the chlorine used in the process.

We will now describe with reference to the accompanying drawings how our invention may be carried out in practice; but we do not limit ourselves to the precise details we shall describe and illustrate.

A is a container of oxygen gas.

B is a retort partly immersed in water contained in a vessel or boiler, which can be heated by any suitable means.

Into the retort B are placed the matters from which the chlorine is produced—for example, black oxide of manganese and hydrochloric acid. Oxygen in sufficient quantity to form the required mixture of chlorine and oxygen, and at the same time to revivify the black oxide of manganese, is admitted to the retort B from the container A by the pipe $a$, leading down into the black oxide of manganese in the said retort. The oxygen and chlorine pass by the pipe $a^3$ from the retort B into the wash-bottle $b$, and therefrom by the pipe $b^2$ into the gasometer C, to effect which the bell of the gasometer C may be caused to rise by adding weights, so as to withdraw the gases from the retort and wash-bottle. When the bell has become filled, the weights are removed, and the gases by the descent of the bell are expelled through pipe $c^2$ into the ozone-generator F, in which they are subjected to the action of an electric current.

E represents the Ruhmkorff coil or other means of obtaining the necessary electric sparking for the purpose, and $E^2$ is the battery charging the said coil. The gases pass from the generator F by the pipe $f$ into the vessel G, in which the pulp is placed and agitated by the stirrer $g$. The pulp thus treated is removed and used for paper-making, which may be performed in the usual manner. The oxygen and chlorine which arise from the pulp are drawn back by the pipe $d$ into the gasometer D by the bell thereof being made to rise by adding weights, and after it has become filled by removing these weights the gases are by the descent of the bell forced through the pipe $d^2$ into the retort B to be again used in the process. The pipes are furnished with valves and cocks to control the supply and direction of flow of the gases.

We preferably use the gases in the proportion of ninety per cent. of oxygen to ten per cent. of chlorine.

Having now particularly described and ascertained the nature of our said invention and in what manner the same is to be performed, we declare that what we claim is—

The method of bleaching fibrous substances for use in paper-making by, first, forming a mixture of oxygen and chlorine gases; second, subjecting said gases to the action of electricity, and, third, subjecting the fibrous substances to the action of such gases, substantially as described.

In testimony whereof we have signed our names to this specification in the presence of two subscribing witnesses.

ARTHUR BRIN.
LÉON QUENTIN BRIN.

Witnesses:
L. CHAPMAN,
  69 *Horseferry Road, Westminster.*
FRAS. JOURDAN,
  *Notary Public, London.*